March 1, 1949.  G. R. ERICSON  2,463,256
INTERNAL-COMBUSTION ENGINE
Filed April 30, 1945  2 Sheets-Sheet 1

INVENTOR.
George R. Ericson

March 1, 1949.  G. R. ERICSON  2,463,256
INTERNAL-COMBUSTION ENGINE
Filed April 30, 1945  2 Sheets-Sheet 2

INVENTOR.
George R. Ericson

Patented Mar. 1, 1949

2,463,256

UNITED STATES PATENT OFFICE 2,463,256

INTERNAL-COMBUSTION ENGINE

George R. Ericson, Kirkwood, Mo., assignor to Carter Carburetor Corporation, St. Louis, Mo., a corporation of Delaware Application April 30, 1945, Serial No. 591,127

34 Claims. (Cl. 123—127)

This invention relates in general to internal combustion engines, and more particularly to improvements in the fueling of engines, affording improved fuel control facilities in a fueling system suitable in particular, for automotive engines.

In the operation of internal combustion engines and in particular, automotive engines intended for operation through a wide range of both speed and loading, it is desirable to provide relatively large mixture passages in the fuel charging system such as to afford the maximum charge delivery capacity necessary for efficient high speed, full load operation of the engine. However, when operating at low or intermediate speeds, and especially upon starting, warm-up, and acceleration of the engine, a high capacity fueling system is in general quite erratic in distribution of the charge, and noticeably inefficient in its performance.

Accordingly, it is a principal purpose of the present invention to provide a means and method for engine fueling and an improved charge forming and cylinder charge supplying system, which will afford maximum charging of the engine to attain efficient high speed, full load operation thereof, together with efficient fuel vaporization and mixture proportioning, as well as improved charge distribution to the engine cylinders, in the period of engine starting and warm-up and during low and intermediate engine speeds. With regard to engine starting in particular, the method and system of engine fueling according to present improvements, will promote positive starting with a minimum of fuel consumption, under particularly adverse or extreme conditions such as for example, abnormally low atmospheric temperatures and a thoroughly cold engine.

Another important object of the present invention is to provide an engine fueling system of improved character for attaining the objectives indicated generally hereinabove, which is effective additionally, to prevent or substantially eliminate fuel detonation under certain engine operating conditions when detonation tends to occur, as for example, during operation at low speeds with the throttle open, and upon engine acceleration.

A further object of the invention is to provide in a fueling system of the character indicated, automatically operated means effective upon engine starting, as well as during engine operation at low and intermediate speeds and in acceleration, for controlling and restricting the flow of fuel mixture to the cylinders in a manner to improve vaporization and distribution of the fuel under each of the foregoing conditions, the flow restricting means further responding to high speed, full load operation of the engine, such as to condition the fueling system for unrestricted, full or maximum charging of the cylinders.

Yet another object of the invention is to provide an improved charge forming and manifold delivery system for multi-cylinder automotive engines, affording a separate charge forming device and intake manifold for each of a plurality of cylinder groups, and including in operative relation to each charge forming device and its associated manifold, a flow restricting means of the character indicated in the immediately foregoing object, the system as thus provided serving most effectively to facilitate engine starting and to improve engine operation under all conditions of speed and loading.

Other objects and advantages of the present invention will appear readily from the following description and the accompanying drawing, in which.

Figure 1:
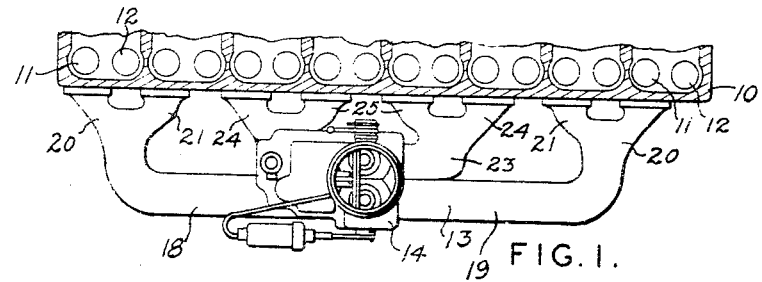
Fig. 1 is a fragmentary somewhat diagrammatic sectional view of an internal combustion engine, more particularly the cylinder head section thereof, showing in application thereto a charge forming and manifold means embodying the improvements afforded by the present invention.

With reference to the drawing and first to Fig. 1 in particular, there is shown in part a cylinder head section 10 adapted for an eight cylinder engine, the head section providing fuel intake control valves and exhaust control valves indicated diagrammatically at 11 and 12 respectively. Carried by the head section is an intake manifold structure 13 and a fuel charge forming or carburetor assembly 14 embodying the improvements afforded by the invention. It is to be noted here that although the manifold 13 and carburetor assembly 14 according to the present example, are adapted to an eight cylinder engine, it will be obvious that the principles of the invention are fully applicable to engines of other numbers of cylinders.

Figure 2:
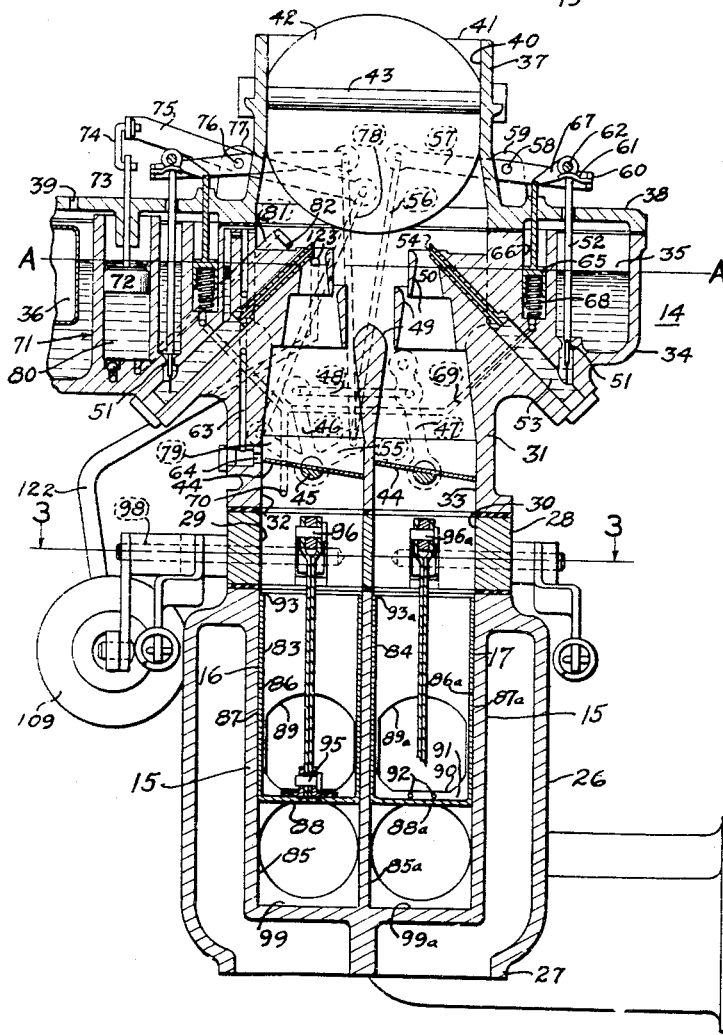
Fig. 2 is a sectional elevation transversely through the charge forming and distributing mechanism of the invention with parts of the charge forming or carburetor device shown somewhat diagrammatically.
Figure 4:
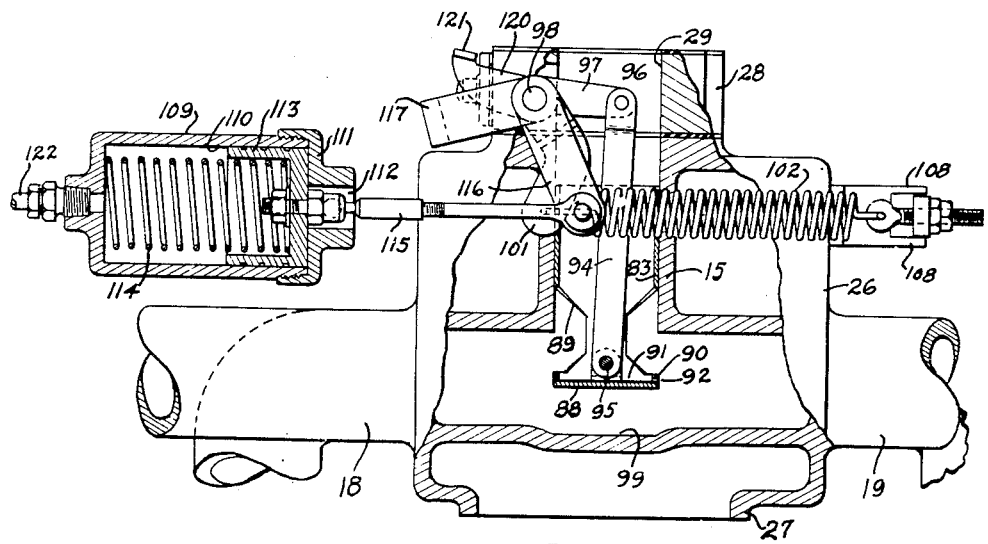
Fig. 4 is a view in vertical elevation and partly in section, of the portion of the mechanism shown by Fig. 3.

The manifold structure 13 as appears in Fig. 1 and as clearly indicated in Figs. 2 and 4, is of a divided construction and provides at its center an upward extension or riser 15 within which are separate upwardly opening fuel inlet passages 16 and 17. Leading oppositely from the lower end of passage 16 are manifold branches 18 and 19 each terminating in relatively short branches 20 and 21, the latter providing manifold outlet ports for communication with the cylinder intake passages of the cylinders. Similarly, extending oppositely from the lower end of manifold passage 17, are further manifold branches 22 and 23 each of which terminates in relatively short branches 24 and 25 for connection to the intake passage (not shown) of cylinders in the intermediate zone of the engine. Very little heating of the intake manifold is required when this device is used, but if desired and as here illustrated, the manifold may be provided with a heating device in the region of the risers or passages 16 and 17, as the jacket 26 adapted at 27 to receive and apply exhaust gases about the manifold intake passages.

The charge forming or carburetor device 14 shown somewhat diagrammatically is of the downdraft type, although this type is not essential to the present invention, and is suitably attached to the manifold extension 15. An insert member or block 28 is interposed between the lower end of the carburetor and the manifold extension 15, and is formed to provide openings or passages 29 and 30 (Figs. 2 and 3) in registry respectively, with the manifold inlet passages 16 and 17. While the carburetor may be of any suitable construction adapted for supplying fuel and air to the divided manifold 13, according to present preference the structure thereof is such as to provide a main casing or body member 31 forming separate mixing conduits or charge forming passages 32 and 33 in communication at their lower ends, with the block passages 29 and 30 respectively. A lateral extension 34 of casing 31 provides a fuel supply chamber or reservoir 35 extending partly about the casing, and in which fuel is maintained at a constant level A—A by suitable well known means, as a float shown in part at 36, in control of a fuel supply valve (not shown).

Above the main body 31 and suitably removably secured thereto, is a casing section 37 having a lateral extension 38 adapted as a cover for the fuel reservoir 35 and provided with the usual reservoir atmospheric vent 39. Within the section 37 is an air intake passage 40 terminating upwardly in an air inlet port or opening 41, and communicating at its lower end with the charge forming passages 32 and 33. An air control or choke valve 42 for regulating the air supply to the carburetor, is eccentrically mounted on a shaft 43, and may be manually or automatically controlled as desired.

Near the lower or discharge end of each of the mixing passages 32 and 33, is a throttle valve 44, and while both valves may be arranged to permit securement thereof upon a common control shaft, each is shown as mounted upon a separate shaft 45 in order to facilitate the sectional diagrammatic disclosure of Fig. 2. However, the throttle valves may be suitably interconnected for conjoint manual operation, as by the shaft levers 46 and 47 and the connecting link 48 shown in broken lines. Intermediate the choke and each throttle valve, as in the upper zone of each of the mixing passages 32 and 33, is a Venturi stack or multiple Venturi formation 49 which may be of conventional character providing an innermost or primary Venturi passage 50. Fuel from reservoir 35 is supplied to the primary Venturi passages through restricted openings or fuel jets 51 each under control of a metering rod 52, and fuel ducts 53 each terminating in a nozzle opening 54 in one of the primary Venturi passages 50.

Control of the metering rods 52 may be effected in accordance with throttle position as here illustrated, by operating connections to the rods preferably from a lateral extension 55 of throttle lever 46. The connections shown diagrammatically and partly in outline, may include as to each metering rod, a connecting rod 56 pivoted to extension 55 and to one end of a lever 57, the latter being pivotally mounted intermediate its ends, as at 58 upon a fixed support 59. The free end 60 of lever 57 carries a finger element 61 arranged so that it may bear beneath a pin 62 at the upper end of the metering rod 52. Thus upon conjoint opening movement of the throttles, the resulting pivotal displacement of the levers 57 will serve through the finger elements 61 thereof, to lift the metering rods to an extent corresponding with the degree of throttle opening, for permitting increased fuel flow through the fuel jets 51.

Other instrumentalities of the carburetor mechanism shown, include an idling fuel passage 63 and nozzle 64 associated with mixing passage 32, and a like passage and nozzle for the mixing passage 33 although the latter idling connection is not here shown. Also, the carburetor may be provided with an additional or supplemental metering rod control, as for temporarily increasing the fuel component of the charge mixture under certain conditions of engine operation, as when the engine is called upon to operate under a relatively heavy load with part-open throttle, or under acceleration at part-opening of the throttle. To this end, a piston 65 operating in a cylinder bore 66 formed in casing 31, is provided for each metering rod 52, and is suitably connected to the associated metering rod by an angular arm 67. The piston is at all times under upward bias such as to lift the metering rod, as imposed by a calibrated spring 68 engaging the piston, while displacement of the piston downwardly in cylinder bore 66 against spring 68, is effected in response to manifold suction imposed on the underside of the piston through a suction passage 69 common to the two piston devices and opening preferably to the mixing passage 32 posterior to the throttle valve therein, as at the port 70. The operation of each piston device as regulated in part by proper selection of its loading spring 68, is such that upon a material reduction of manifold vacuum and hence a correspondingly decreased suction acting on the piston 65, the loading spring 68 then becomes effective to displace the piston upwardly in its cylinder bore for effecting through the arm 67, a corresponding lift of the metering rod 52. The extent of rod lift preferably is determined proportionately to the decrease in manifold vacuum, such as to afford the required increase in the fuel component of the fuel mixture under the engine operating conditions hereinabove indicated. On the other hand, as soon as the manifold vacuum approaches or rises above a predetermined value, as at or above three inches of mercury for example, the resulting increased suction imposed on the piston 65, causes a downward displacement thereof until the metering rod pin 62 engages the finger element 61 of the throttle connection. Thereafter and until further mixture enriching demand is made upon the metering rod through the described piston device, the metering rod is under direct control by and in accordance with throttle positioning.

The carburetor may have in addition, the usual or well known provisions for delivering supplemental fuel to the intake system in response to quick opening of the throttles. As here shown broadly, the mechanism for this purpose comprises a pump indicated generally at 71, arranged in the fuel reservoir and including a piston 72 which is connected with the throttle valves for actuation thereby. The piston-throttle connection as indicated diagrammatically and partly in outline, includes a piston rod 73, a link 74 pivotally connecting the piston rod to one end of a lever 75, the latter being pivoted at 76 upon a fixed support 77, and a rod 78 pivoted to the opposite end of lever 75 and projected downwardly to a pivotal connection with a lateral extension 79 of the throttle lever 46. Leading from the pump chamber 80 are suitable fuel passages which terminate in delivery nozzles at appropriate points in the carburetor mixing passages 32 and 33. Only one of these passages is presently illustrated, as the passage 81 terminating in a fuel nozzle 82 shown as located exteriorly to but near the throat end of the primary venturi 50 in mixing passage 32. While the operation of the pump device according to its purpose, is well known, it may be stated briefly that upon quick opening of the throttles 44, the pump piston 72 will be displaced downwardly in the chamber 80. Assuming a supply of fuel in the latter, such piston displacement will force a suitable, metered quantity of fuel through passage 81 for example, to discharge at the nozzle 82, whereby to enrich the fuel charge admitted to the engine.

As hereinbefore objectively stated, the present invention provides a method of engine fueling and a cylinder charge supplying system of improved character, affording particularly in the period of engine starting and warm-up and during low and intermediate engine speeds, efficient and adequate fuel vaporization and mixture proportioning, as well as improved fuel distribution in the intake manifold system. According to the fueling method here proposed, manifold admission of fuel and air from the carburetor is relatively highly restricted and controlled in a positive manner as to directional manifold distribution, at starting and during engine idling, and is similarly restricted and controlled to a degree corresponding with engine operation at speeds below a predetermined high speed, as below the engine speed obtaining when the automotive vehicle with which the engine is associated, attains a speed of about 40 miles per hour. Further and according to the method, the character of restriction and control effected upon engine cranking in particular, is such as to cause initially and ahead of primary air admission, a suction induced jet delivery of fuel to the manifold under directional control relative to the manifold passages, and thence a high velocity manifold introduction of air such as to result in positive fuel pick-up and a high degree of fuel vaporization or atomization, whereby to assure an intimate mixing of fuel and air for cylinder intake. Coincidentally with the foregoing, proper mixture proportioning and directional distribution of the mixture as to the manifold passages, are determined to a particularly marked degree. In consequence of the indicated character of manifold intake, positive and quick engine starting even under extremely adverse conditions such as abnormally low atmospheric temperatures and a thoroughly cold engine, may be readily attained and with greater economy of fuel consumption, the latter appearing in particular because of the high degree of fuel vaporization and the more intimate fuel air mixture consequent therto. Moreover, fuel economy in the starting phase is further assured by reason of the foregoing and the high velocity directional flow of mixture in the manifold passages, which thus reduces to an appreciable degree, fuel wetting of the manifold passage surfaces, and avoids more than a substantially negligible minimum of fuel condensation on these surfaces.

Following engine starting and during the warm-up phase, and thereafter during operation of the engine at idling, low and intermediate speeds, engine fueling is determined in varying but material degree according to the method herein presented, as to provide the desired character of fuel vaporization, and mixture proportioning, as well as directional distribution of the mixture in the manifold passages, whereby to facilitate and promote improved and more efficient engine functioning under each and all of the aforesaid operating conditions. Finally and in accordance with the method of fueling here proposed, the restriction of manifold mixture admission such as to obtain the advantages hereinabove noted under the indicated conditions of engine operation, is very materially reduced or practically eliminated as the engine speed approaches or exceeds the indicated predetermined high value, so as to condition the fueling system for maximum engine charging during high speed, full load operation of the engine.

Turning now to the presently preferred control instrumentalities of novel character for determining engine fueling in accordance with the hereindescribed method, such include valve devices 83 and 84 arranged respectively in the manifold riser or intake passages 16 and 17, each valve preferably being of hollow cylindrical sleeve valve character and adapted for vertical displacement in the associated passage. Valve 83 as shown, is confined to linear movement relative to passage 16 across the throat zone 85 at the juncture of manifold branches 18 and 19 (Figs. 2 and 4), principally by guided engagement of its sleeve wall 86 with the wall 87 of the passage 16. Closing the lower end of the hollow valve is an imperforate wall or valve head 88, while formed in the sleeve wall 86 at diametrically opposite points, are valve ports 89 each of which as appears, is of an area approximating the transverse passage area of the manifold branch 18 or 19. The lower margins of the ports 89 terminate above or beyond the head wall 88 such as to leave flange-like wall elements 90 which cooperate with the head wall 88 and adjacent portions of the sleeve wall 86 to define a relatively shallow, interior chamber 91 between the ports and valve head. The wall elements 90 are provided with one or more calibrated ports 92, as illustrated in Fig. 4. The sleeve valve as thus described, is in constant communication through its upper open end 93, with the manifold intake passage 16 and the passage 29 in the block 28 heretofore mentioned, the latter passage opening directly to the carburetor passage 32.

Operatively supporting the sleeve valve 83 is an arm 94 pivotally secured to the valve head 88 as at 95, and extending upwardly in the hollow valve for pivotal connection at 96 to the end of a shaft lever 97, the latter being keyed or otherwise secured upon an operating shaft 98 suitably rotatably journalled in the block element 28 (Fig. 4), and through which the sleeve valve is controlled as will appear presently. The valve 83 thus supported in a nonrotative relation to passage 16 and confined to linear movement only, as hereinbefore described, is arranged in assembly such that the opposite ports 89 and flange ports 92 will come into direct communication with the passages of the manifold branches 18 and 19 upon downward valve displacement. Moreover and in order to permit at times, full registry of the ports 89 with the manifold passages, a manifold throat recess 99 is provided to receive therein the valve head 88 and the flanged section having the ports 92. Abutment of the valve head 88 with the bottom of the recess 99 may be utilized to determine the limit of downward valve displacement, and when occurring, conditions the valve for maximum charge delivery to the manifold passages. On the other hand, when the valve is in its uppermost or closed position (Fig. 2), the valve ports 89 and 92 may, if desired, be completely removed from communication with the manifold passages.

The control valve 84 in manifold riser passage 17, may be and is as here shown, substantially identical to the described valve 83, and bears a similar operative relation as to the passages of manifold branches 22 and 23 and the inlet passage 17. Accordingly for simplicity of description, the reference characters utilized in connection with valve 83 are applied with respect to valve 84, but differentiated by letter suffixes.

Figure 3:
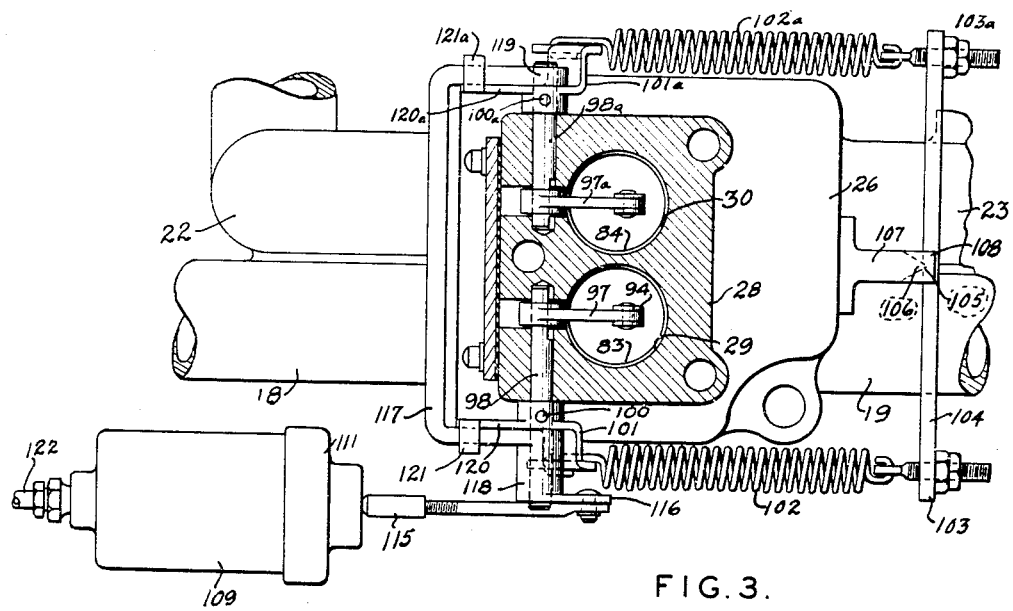
Fig. 3 is a horizontal section through a part of the mechanism, as taken along line 3—3 in Fig. 2 and illustrating in particular, control means forming a part of the invention.

The shaft 98 associated with valve 83, is extended laterally and externally of block 28 (Fig. 3), and suitably secured upon the shaft as by pin 100, is an arm 101. A valve loading spring 102 of predetermined capacity, is connected at one end to the arm 101, and at its opposite end is adjustably secured to the end 103 of a pivot bar or balance lever 104. Similarly, the shaft 98a of valve 84 likewise extended laterally and outwardly of block 28, supports an arm 101a connected to the shaft by pin 100a, and to this arm is secured one end of a like loading spring 102a. The opposite end of spring 102a is similarly adjustably connected to the opposite end 103a of balance bar 104. As shown in Fig. 3, the bar or lever 104 is provided with a transverse notch or groove 105 at its mid-point, to receive and pivotally bear upon the convergently tapered end or knife edge 106 of a pivot bearing member 107. The member 107 is suitably mounted upon the jacket 26 of the manifold extension 15, and is formed to provide guide flanges 108 for the bar 104, which serve to retain the bar in pivotal engagement with the pivot bearing. Accordingly it now will appear that the valve biasing or loading springs have a common support in the bar 104, and further, that through the pivotal support of the bar 104 at its center, opening displacement of one valve as 83 or 84, tending to extend or expand its associated spring, will tend to produce pivotal movement of the bar 104.

However, such pivoted displacement of the bar is then opposed by the spring of the other valve, so that upon continued opening movement of the first valve, the spring of the other valve will be subjected to an increasing force in the direction to extend the spring, and hence will result in an increased spring bias on the other valve. Consequently, the valve loading arrangement thus provided, may be characterized as one which affords a mutually compensating bias of the valves 83 and 84 wherein each spring provides a component of the total force acting on each valve, so that upon opening displacement of one valve relative to the other, both springs act in proportionate degree to oppose such displacement, and further upon closing displacement of one valve relative to the other, both springs act in aid of valve closure.

Included in the improvements afforded by the present invention, is a provision of a novel and particularly effected character, for opening the valves 83 and 84 to a substantial extent and in particular, to full-open positions so as to condition the fueling system for unrestricted, maximum charging of the engine during high speed, full load engine operation. As illustrated in Figs. 2, 3 and 4, located preferably near the manifold jacket casing 26 is a pneumatic or suction operated device 109 comprising a cylinder 110, cylinder cap 111 centrally apertured therethrough at 112, a piston 113 slidably received in the cylinder and preferably urged toward the cap 112 by a suitable spring 114, and a piston connecting rod structure 115 projecting outwardly through the cap aperture 112. The device 109 may be carried on the manifold 13 or attached to the jacket 26 in any suitable manner not here shown, and has the piston rod 115 thereof pivotally connected to an arm 116 formed as a part of a valve actuating bar 117. The bar 117 which may be of yoke-like character as shown, includes bearing portions 118 and 119 freely rotatable received upon the respective valve shafts 98 and 98a (Fig. 3). An operative connection of a lost-motion character, is afforded between the bar 117 and each of the valve spring arms, as 101 and 101a, by an arm extension 120 on arm 101 and a projection or finger element 121 near the free end of the extension and overlying the adjacent portion of bar 117, and by a similar extension 120a on arm 101a and finger element 121a overlying the adjacent portion of bar 117. The initial position of bar 117 as shown in Figs. 3 and 4, determined when the piston 113 of the pneumatic device substantially engages or abuts the cylinder cap 111, is such that the finger elements 121 and 121a may approach or substantially engage the bar 117 when the associated control valves 83 and 84 are in the full-closed positions heretofore indicated, and hence these elements at such time, may serve to determine the limit of valve closure under the loading of springs 102 and 102a. Moreover, so long as the bar 117 is retained in its initial position, the valves 83 and 84 are free for opening and closing displacement in response to varying differential forces resulting from the loading springs and engine developed forces hereinafter to appear. However, upon displacement of the piston 113 from its initial position, the bar 117 will be thereby pivotally actuated to a corresponding extent in the upward direction as viewed in Fig. 4, to effect through the finger elements 121 and 121a and the associated valve operating mechanism, positive opening displacement of the valves 83 and 84 against the opposing bias of the springs 102 and 102a.

Operation of the pneumatic device 109 such as to produce substantial or full opening of the valves 83 and 84, is effected by sufficient evacuation of the cylinder 110 to permit atmospheric air pressure acting at all times on the piston 113 through the cap aperture 112, to displace the piston inwardly of the cylinder against the opposing force imposed by the spring 114 as augmented by the valve springs 102 and 102a when the bar 117 engages the finger elements 121 and 121a of the valve lever system. Evacuation of cylinder 110 is here advantageously produced by suction developed in the throat of one or the other of the primary Venturi passages 50, and induced in the cylinder through a conduit 122 leading therefrom to a suction port 123 located by present preference, in the throat of the primary Venturi passage 50 associated with the mixing passage 32. The suction port 123 is of such calibrated area as will assure cylinder evacuation in response to Venturi suction of the order developed by engine operation under full load and at or above a predetermined high speed, to the degree required under the spring loaded valve system here described, for permitting piston displacement in sufficient extent to produce displacement of the valves 83 and 84 toward and into their full-open positions relative to the associated manifold passages.

Describing now the operation of the improved system and devices for controlling engine fueling in the respects hereinbefore objectively indicated, in the idle or non-operating condition of the engine, the piston 113 of the pneumatic device 109 is in its initial position, as in engagement with the cylinder cap 111 (Fig. 4), which thus determines the lowered position of bar 117 as shown in Fig. 4. At this time also, the valve devices 83 and 84 under the influence of the valve biasing or loading springs 102 and 102a, occupy the uppermost or manifold inlet closing positions as shown in Fig. 2, being limited thereto according to present preference, by abutment of the finger elements 121 and 121a with the bar 117.

Upon initial cranking of the engine at start, and at which time the carburetor air inlet or choke valve 42 may be partly or substantially closed, at least one of the engine cylinders associated with the manifold branches 18 and 19 for example, will be undergoing the suction cycle with its intake valve open. Consequently, the suction then induced in the manifold branches and applied to the valve head 88 of the valve device 83 in manifold inlet passage 16, will cause an initial or slight opening displacement of the valve against the opposing force of spring 102. As this displacement occurs, the first slight movement of the valve serves to expose only the calibrated valve ports 92 to the passages of the manifold branches 18 and 19, so that the manifold suction is then immediately reflected through these ports, in the carburetor mixing passage 32 to induce fuel intake from the nozzle 64 of the idling feed system. Whereupon liquid fuel falling into the shallow valve head chamber 91, will be educed through the ports 92 by manifold suction, and substantially jetted longitudinally in the manifold branches. The proportion of air entering with the fuel at this instant, is highly restricted by the relatively small ports 92, and hence enters the manifold branches at very high velocity. In consequence thereof and further by reason of the jet admission of the fuel, the liquid fuel is highly vaporized or atomized and produces with the air, a rich mixture for engine intake.

The valve 83 continues its opening displacement such as to effect an initial relatively slight opening of the main or primary air and fuel inlet ports 89, in response to increasing manifold suction obtaining as the cylinder then undergoing the suction cycle, approaches and passes through the maximum suction effort afforded thereby under the cranking speed of piston displacement. When the valve ports 89 are thus "cracked open," an increased volume of air is then induced to flow at high velocity through the ports, the high velocity air flow thereby serving to pick up liquid fuel entering from the idling nozzle 64, as well as any fuel tending to collect in the shallow valve chamber 91. The fuel so picked up, is highly vaporized or atomized by action of the high velocity air flow through the "cracked-open" ports 89, such as to result in an intimate fuel air-mixture of comparatively rich proportioning. Moreover, by reason of the disposition of the ports 89 relative to the manifold passages, a highly desirable directional distribution of the mixture in the manifold branches is afforded in the present system, this resulting in particular from the location of these ports in planes substantially transverse of the manifold passages, which thus serves to direct the fuel mixture longitudinally of the latter passages.

From the foregoing it will be observed that in the initial phase of valve opening, the small calibrated ports 92 afford fuel introduction before or ahead of primary air admission through ports 89. Accordingly, the resulting initial fuel mixture in the manifold intake system, constitutes essentially a pilot charge of rich mixture character which, with the following highly vaporized fuel mixture induced in the manifold and cylinder intake passages through the main ports 89, produces a resultant fuel charge of relatively rich proportions to assure quick engine firing at start, even under the most adverse conditions.

It will be now appreciated that as the cylinders associated with the manifold branches 18 and 19, successively enter upon and pass through the suction cycle during engine cranking and as the engine starts firing, the suction induced in the manifold branches will alternately rise and fall, and as a result thereof, the valve 83 will fluctuate correspondingly between closed and "cracked open," positions, thus producing a fluctuating mixture intake of the character above described.

Coincidentally with the foregoing, the valve 84 in the inlet passage 17 of the manifold branches 22 and 23 associated with the central bank or group of cylinders, is actuated in exactly the same manner going through the same cycle of fuel and air admission control and directional mixture distribution in the manifold branches 22 and 23 as described in connection with the valve 83. However, the control valves 83 and 84 do not operate wholly independently of each other, since the valve loading springs thereof have a common support in the balance bar 104 pivotally supported at its center as heretofore described. As a result, opening displacement of one valve may and normally will impose on the other valve through the springs and bar, an increased resistance to opening movement of the latter valve. Depending upon the firing order of the engine cylinders, this action of the spring assembly to increase valve loading, may take place alternately as to the valves or substantially simultaneously as to both valves 83 and 84, but in either instance, the loading effect of both springs upon each valve is determined to be such as to assure no more than a predetermined extent of valve opening displacement at each valve in response to engine developed forces occurring at speeds below a predetermined high speed operation of the engine, as principally manifold suction during engine cranking, and the combined effect of manifold suction and mixture flow from the carburetor mixing passages when the engine starts and continues power operation at idling and low and intermediate speeds.

It is to be noted that due to the high degree of fuel vaporization and the improved character of manifold distribution as here afforded to a very material extent in the engine starting phase, positive and quick engine starting may be readily attained, with a desirable minimum of fuel consumption. The latter results in particular, because of the positive fuel vaporization and intimate mixture with air of the order here attained, and the directional mixture distribution as to the manifold passages, which cooperate to prevent no more than a negligible minimum of liquid fuel deposit on the walls of the manifold intake system.

The increased manifold suction attending the relatively high speeds of piston displacement upon engine firing, as compared to the cranking speeds thereof, then serves to determine correspondingly increased opening of the valves 83 and 84 as maximum suction appears in the suction cycle. However, maximum opening displacement of these valves upon engine start and warm-up at idling speed, is limited to not substantially more than a small degree of port opening at the ports 89 and 89a, by reason of the relatively low manifold suction then afforded, as well as the mutual character of spring loading of the valves as hereindescribed. At low and intermediate speeds of the engine, the valves will open to a correspondingly greater extent, but materially less than full-opening thereof, this being effected by the combined effects of increased manifold suction and the velocity flow of fuel mixture against the valve heads 88 and 88a and through the ports 89 and 89a.

Consequently, from the foregoing description of operation, it will appear that in respect to each of the engine conditions discussed, as engine cranking, starting and warm up at idling speed, and low and intermediate speed functioning of the engine, a like character of fueling control is afforded, varying in degree only as the engine is subjected to one or another of the conditions indicated. Moreover and importantly to efficient, smooth engine functioning, the present method and system of engine fuel control is particularly effective to prevent fuel detonation upon operation of the engine under conditions tending to result in detonation, as during acceleration from a low or intermediate speed, or when operating at relatively low speed with the throttle full open or nearly so. Under such conditions, the control valves 83 and 84 in response to the degree of manifold suction and mixture flow from the carburetor as these factors then obtain, thereupon act to restrict manifold admission of fuel and air in accordance with the particular engine operating condition, such as to determine the degree of fuel vaporization and mixture proportioning required to effect smooth engine operation without detonation.

Considering now the provisions for conditioning the fueling system for unrestricted maximum charging of the engine to maintain efficient high speed, full load operation thereof, when the engine speed approaches a predetermined high value, as that speed obtaining upon vehicle travel at the rate of about 40 miles per hour, the kinetic suction effort appearing at the port 123 in the throat of primary venturi 50 in the carburetor mixing passage 32, increases to a correspondingly high value. At such time, the cylinder 110 of pneumatic device 109 becomes sufficiently evacuated in consequence of the kinetic suction at venturi 50, to permit atmospheric pressure displacement of the piston 113. Upon piston displacement initially against the spring 114, the yoke bar 117 is thereby raised into contact with the finger elements 121 and 121a of the valve operating mechanism. Whereupon, further movement of the piston effects through the bar and finger elements, positive actuation of the valves 83 and 84 toward and into their full-open positions wherein the ports 89 and 89a are completely open to the respective manifold passages. Thus these valves are then substantially eliminated or removed from restrictive control of manifold mixture intake, and remain in their full-open positions throughout engine operation during travel of the automotive vehicle at a speed approximating or in excess of 40 miles per hour. However and as will be now understood, whenever the engine speed is decreased below the indicated predetermined high speed, as to low or intermediate speeds, or to idling, the reduced kinetic suction at port 123 permits return of piston 113 to its initial position under the influence of return spring 114, so that the control valves 83 and 84 may then function as hereindescribed.

In the present embodiment of the invention adapted to a multicylinder engine, as an eight cylinder engine here indicated, the functioning of the fueling system is considerably enhanced by the particular arrangement which provides in general, carburetion, manifolding and manifold intake control separately as to each of two equal cylinder groups. In consequence thereof, each of the fuel vaporizing and manifold mixture directioning valves is very considerably more effective to regulate engine fueling and mixture proportioning in the manner hereindescribed, as to the lesser number of cylinders, than would obtain in the instance of a single valve in control of all eight cylinders at one time. In fact, were only one vaporizing valve employed in a single intake manifold common to the eight cylinders, the intended accurate control functioning thereof would tend to be destroyed or reduced to only an indifferent action, as a result in part at least, of the character of manifold pulsations produced by multiple overlapping of cylinder intake. Accordingly, the presently improved arrangement assures improved maximum engine charging under high speed, high load operating conditions, and attains in an effective and efficinet manner, the character of fueling control hereindescribed under the conditions of engine starting and power operation at idling, low and intermediate speeds.

Having now fully disclosed the method of engine fueling and the improved fuel control facilities as provided according to the present invention, it will be appreciated that the system and control devices may be altered or modified without departing from the spirit and intended scope of the invention as defined by the appended claims.

I claim:

1. The method of fueling a multi-cylinder internal combustion engine having a plurality of cylinder groups, which comprises supplying fuel and air to intake manifolds individual to the cylinder groups, restricting fuel and air admission separately as to each manifold during engine operation below a predetermined speed, and regulating admission restriction at one manifold in accordance with the restriction obtaining at another of the manifolds.

2. The method of fueling a multi-cylinder internal combustion engine having a plurality of cylinder groups, which comprises supplying fuel and air to intake manifolds individual to the cylinder groups, automatically restricting fuel and air admission separately as to each manifold and in accordance with engine speed during engine operation at certain speeds, and regulating admission restriction at one manifold in accordance with the restriction obtaining at another of the manifolds.

3. The method of fueling a multi-cylinder internal combustion engine having a plurality of cylinder groups, which comprises supplying fuel and air to intake manifolds individual to the cylinder groups, restricting fuel and air admission separately as to each manifold during engine operation below a predetermined speed, regulating admission restriction at one manifold in accordance with the restriction obtaining at another of the manifolds, and eliminating the restriction of fuel and air admission to the manifolds when the engine attains or exceeds the said predetermined speed.

4. The method of fueling a multi-cylinder internal combustion engine having a plurality of cylinder groups, which comprises supplying fuel and air to intake manifolds individual to the cylinder groups, automatically restricting fuel and air admission separately as to each manifold and in accordance with engine speed during engine operation below a predetermined speed, regulating admission restriction at one manifold in accordance with the restriction obtaining at another of the manifolds, and eliminating the restriction of fuel and air admission to the manifolds when the engine attains or exceeds the said predetermined speed.

5. In an internal combustion engine, a fuel and air delivery device, an intake manifold having an inlet for receiving fuel and air from said device, mixture control means in the zone of said manifold inlet, effective in response to manifold suction developed upon engine cranking, to establish a predetermined opening in the zone of said inlet, of a character to determine vaporization of fuel and its intimate mixture with air upon manifold admission, said control means further being adapted to determined directional distribution of the mixture in the manifold, and means responsive to suction developed in said delivery device upon power operation of the engine at speeds in excess of a predetermined rate, for conditioning said control means to permit substantially unrestricted manifold admission of fuel and air mixture through said inlet.

6. In an internal combustion engine having a plurality of cylinder groups, separate intake conduits for supplying fuel mixture to said groups, mixture flow control means in each of said intake conduits effective automatically when the engine speed is low, to restrict the flow of mixture in the conduit, and means operable in response to a force developed in one of said conduits anterior to the flow restricting means therein upon operation of the engine at speeds in excess of a predetermined rate, for conditioning the control means of said conduits to permit substantially unrestricted mixture flow in the several intake conduits.

7. In an internal combustion engine having a plurality of cylinder groups, separate intake conduits for supplying full mixture to said groups, mixture flow control means in at least one of said intake conduits and effective automatically when the engine speed is low, to restrict the flow of mixture in the conduit, and means responsive to kinetic suction determined in another of the intake conduits upon operation of the engine at speeds in excess of a predetermined rate, for conditioning said flow control means to permit substantially unrestricted mixture flow in the associated intake conduit.

8. In an internal combustion engine having a plurality of cylinder groups, separate intake conduits for supplying fuel mixture to said groups, a throttle valve in each conduit, mixture flow control means in at least one of the intake conduits and effective automatically when the engine speed is relatively low, to restrict the flow of mixture in the conduit, and means responsive to suction developed in another of the intake conduits anterior to the throttle valve therein upon relatively high engine speeds, for conditioning the flow control means to permit substantially unrestricted mixture flow in the associated conduit.

9. In an internal combustion engine having a plurality of cylinder groups, separate intake conduits for supplying fuel mixture to said groups, a manually operated throttle valve in one of said conduits, a mixture flow control valve associated with each of said conduits and adapted for effecting a mixture flow restriction in the conduit when the engine speed is low, and means acting in response to kinetic suction developed in the conduit having said throttle valve therein, when the engine speed is relatively high, to operate said flow control valves simultaneously such as to eliminate restriction thereby to mixture flow in the conduits.

10. In an internal combustion engine having at least two cylinder groups, separate intake conduits for supplying fuel mixture to said groups, manually operated throttle valves in said conduits, a mixture flow control device arranged in each conduit posterior to the throttle valve therein and operative to effect mixture flow restriction in the conduit when the engine speed is relatively low, yieldable balancing means common to said flow control devices and effective to influence the flow restricting operation of each control device in accordance with the flow restricting operation of the other control device, and means responsive to suction developed in one of the intake conduits at a point anterior to the throttle valve therein, upon operation of the engine at a relatively high speed, for overcoming said yieldable balancing means and positioning said control devices such as substantially to eliminate conduit flow restriction thereby.

11. In an internal combustion engine having at least two cylinder groups, separate intake conduits for supplying fuel mixture to said groups, manually operated throttle valves in said conduits, a fuel vaporizing and mixture distributing device in each conduit posterior to the throttle valve therein, operative to determine fuel vaporization and mixture distribution in the conduit when the engine speed is relatively low, yieldable means common to said devices and effective to influence the operation of each device in accordance with the operation of the other, and pneumatic means operatively responsive to kinetic suction developed in one of said conduits at a point anterior to the throttle valve upon engine operation at a relatively high speed, for overcoming said yieldable means and rendering said devices inoperative.

12. The combination with the fuel mixture passageway of an internal combustion engine, of a mixture flow control valve therein adapted to be opened by suction of the engine, means yieldably opposing opening of the valve, and means having a lost-motion connection with said valve, operable in response to passageway suction developed therein anterior to the valve upon relatively high speed operation of the engine, for actuating said valve toward a full-open position.

13. The combination with the fuel mixture passageway of an internal combustion engine, of a mixture flow control valve therein adapted to be opened by suction of the engine, means yieldably opposing opening of the valve, and a pneumatic device including a lost-motion connection with said valve, operable in response to kinetic suction developed in the passageway upon relatively high speed operation of the engine, for actuating said valve toward a full-open position.

14. The combination with the charge forming device and intake manifold of an internal combustion engine, of a fuel vaporizing and mixture distributing valve adapted to be opened to an initial extent by manifold suction developed upon relatively low speed cranking of the engine, said valve being effective when so opened to determine fuel vaporization and directional mixture distribution in the manifold, and means having a lost-motion connection with said valve, operable in response to kinetic suction developed in the charge forming device upon relatively high speed operation of the engine, for actuating said valve toward a full-open position.

15. The combination with the charge forming device and intake manifold of an internal combustion engine, wherein the manifold is provided with an inlet passage to receive fuel and air from the charge forming device, of a control valve initially closing the manifold inlet passage and adapted to be opened to a predetermined small extent by manifold suction developed upon engine cranking, said control valve further being adapted for determining when so opened, fuel vaporization and directional mixture distribution in the manifold, and a pneumatic device having a lost-motion connection with said control valve, operable in response to kinetic suction developed in the charge forming device upon power operation of the engine at relatively high speeds, for actuating said control valve toward a full-open position relative to the manifold inlet passage.

16. The combination with the charge forming device and intake manifold of an internal combustion engine, wherein the manifold is provided with an inlet passage for receiving fuel and air from the charge forming device, of a control valve in said manifold inlet passage, yieldable means acting on said valve to dispose the same initially in a position to close the manifold inlet passage, said valve being adapted for opening movement to a predetermined minimum extent against the closing influence of said yieldable means, in response to manifold suction as developed upon engine cranking, and further being adapted for determining when so opened, fuel vaporization and directional mixture distribution in the manifold, and a pneumatic device having a lost-motion connection with said control valve, effective in response to kinetic suction as developed in the charge forming device upon power operation of the engine at relatively high speeds, for overcoming said yieldable means and actuating the control valve toward a full-open position relative to the manifold inlet passage.

17. In a charge forming device for an internal combustion engine, means forming a conduit having an air inlet at one end and adapted at the other end for charge delivery connection to the engine, a Venturi passage in the conduit, a fuel supply passage opening to said Venturi passage, a manually operable throttle in the conduit, a fuel vaporizing valve in the conduit posterior to the throttle, yieldable means tending to effect closure of the valve, and a control device having a lost-motion connection with said valve, adapted for response to suction developed in said Venturi passage, to operate said valve against said yieldable means.

18. In a charge forming device for an internal combustion engine, an intake manifold having an inlet port and outlet ports spaced therefrom, a carburetor including a mixing conduit communicating with said manifold inlet port, a control valve in the zone of said inlet port, capable of restricting the inlet port such as to cause fuel vaporization and to determine directional distribution of the fuel charge in the manifold toward the outlet ports thereof, yieldable means influencing said conrol valve in the direction to effect maximum restriction of the inlet port, and means responsive to suction developed in said carburetor mixing conduit, for overcoming said yieldable means and influencing said control valve in the direction to effect minimum restriction of the manifold inlet port.

19. In a charge forming device for an internal combustion engine, an intake manifold having an inlet port and outlet ports spaced therefrom, a carburetor including a mixing conduit communicating with said manifold inlet port and a throttle valve in the conduit, a control valve in the zone of said inlet port capable of restricting the inlet port such as to cause fuel vaporization and to determine directional distribution of the fuel charge in the mainfold toward the outlet ports thereof, yieldable means influencing said control valve in the direction to effect maximum restriction of the inlet port, and means responsive to suction developed in said carburetor mixing conduit anterior to the throttle valve therein, for overcoming said yieldable means and influencing said control valve in the direction to effect minimum restriction of the manifold inlet port.

20. In a charge forming device for an internal combustion engine, an intake manifold having an inlet port and outlet ports spaced therefrom, a carburetor connected to said inlet port and including means forming a mixing conduit and a Venturi passage therein, a fuel supply nozzle opening in the Venturi passage, a throttle in the conduit, a control device in the zone of said manifold inlet port, capable of restricting the inlet port such as to cause fuel vaporization and to determine directional distribution of the fuel charge in the manifold toward said outlet ports thereof, and means responsive to suction developed in said Venturi passage, for rendering said control device ineffective to restrict said manifold inlet port.

21. In a charge forming device for an internal combustion engine, an intake manifold having an inlet port and outlet ports spaced therefrom, a carburetor connected to said inlet port and including means forming a mixing conduit and a Venturi passage therein, a fuel supply nozzle opening in the Venturi passage, a control valve in the zone of said manifold inlet port, capable of restricting the inlet port such as to cause fuel vaporization and to determine directional distribution of the fuel charge in the manifold toward said outlet ports thereof, means influencing said control valve in the direction to effect maximum restriction of the manifold inlet port, and means responsive to suction developed in said Venturi passage, for influencing said control valve in the direction to effect minimum restriction of the manifold inlet port.

22. In a charge forming device for an internal combustion engine, an intake manifold having an inlet port and outlet ports spaced therefrom, a carburetor connected to said manifold inlet port, the carburetor including means forming a mixing conduit and a Venturi passage therein, a control valve in the zone of said manifold inlet port, capable of restricting the inlet port such as to cause fuel vaporization and to determine directional distribution of the fuel charge in the manifold toward the outlet ports thereof, yieldable means influencing said control valve in the direction to effect maximum restriction of the inlet port, and pneumatic means having a suction connection with said Venturi passage and a lost-motion connection with said control valve, responsive to Venturi suction of a predetermined high order, for overcoming said yieldable means and actuating said control valve in the direction to effect minimum restriction of the manifold inlet port.

23. In a charge forming device for an internal combustion engine having at least two cylinder groups, separate intake manifolds for said groups each having an inlet port and outlet ports spaced therefrom, a carburetor providing mixing conduits each communicating with the inlet port of one of the intake manifolds, means forming a Venturi passage in each of said mixing conduits, a fuel supply nozzle opening in each Venturi passage, a control valve in the zone of each of said manifold inlet ports, capable of restricting the inlet port such as to cause fuel vaporization and to determine directional distribution of the fuel charge in the manifold toward the outlet ports thereof, yieldable means common to said control valves and influencing each valve in the direction to effect maximum restriction of the associated manifold inlet port, and means responsive to suction developed in one of said Venturi passages, for overcoming said yieldable means and influencing said control valves in the direction to effect minimum restriction of the manifold inlet ports.

24. In an internal combustion engine, a fuel mixture conduit leading to the engine, and a fuel and air mixture control means operatively associated with the conduit, said means including a control member movable relative to the conduit and having ports of differential capacity, said control member being movable in response to engine developed suction in the conduit obtaining upon engine cranking, such as initially to position one of said ports for determining conduit flow of fuel and air therethrough, and thence to partly open another of said differential capacity ports to the conduit for permitting a correspondingly restricted conduit flow of fuel and air therethrough.

25. In an internal combustion engine, a fuel mixture conduit leading to the engine, and a fuel and air mixture control means operatively associated with the conduit, said means including a control member movable relative to the conduit and having at least two ports of differing capacity, said control member being movable in response to engine developed suction in the conduit obtaining upon engine cranking, such as initially to open the port of lesser capacity to the conduit for permitting conduit flow of fuel and air therethrough, and thence to partly open the port of greater capacity to the conduit for permitting a correspondingly restricted conduit flow of fuel and air therethrough.

26. In an internal combustion engine, a fuel mixture conduit leading to the engine, a throttle in the conduit, and a fuel and air mixture control means operatively associated with the conduit and including a control member movable relative to the conduit at a point thereof posterior to the throttle, said control member having at least two ports of differing capacity, and being movable in response to engine developed suction in the conduit obtaining upon engine cranking, such as initially to open the port of lesser capacity to the conduit for permitting fuel and air flow therethrough, and thence to partly open the port of greater capacity to the conduit for permitting a correspondingly restricted conduit flow of fuel and air therethrough.

27. In an internal combustion engine, a fuel mixture conduit leading to the engine and having a throttle therein, a fuel and air mixture control means operatively associated with the conduit and including a control member movable relative to the conduit in a zone thereof posterior to the throttle, said member being movable responsively to engine developed suction in the conduit obtaining upon engine cranking, and adapted to determine upon suction movement thereof, an initial jet flow of fuel in the conduit toward the engine and thence a highly restricted flow of fuel and air in the conduit toward the engine, and means responsive to suction developed in the conduit anterior to the throttle upon power operation of the engine at a predetermined speed, adapted for moving said control member relative to the conduit, such as to position the member for permitting substantially unrestricted mixture flow in the conduit.

28. In an internal combustion engine, a fuel mixture conduit leading to the engine and having a throttle therein, a fuel and air mixture control means operatively associated with the conduit and including a control member movable relative to the conduit in a zone thereof posterior to the throttle, said member being movable responsively to engine developed suction in the conduit obtaining upon engine cranking, and adapted to determine upon suction movement thereof, an initial jet flow of fuel in the conduit toward the engine and thence a highly restricted flow of fuel and air in the conduit toward the engine, and a pneumatic device having a lost-motion connection with said control member, adapted for operation in response to suction developed in the conduit anterior to the throttle upon power operation of the engine at a predetermined speed, to move said control member relative to the conduit such as to condition the member for permitting substantially unrestricted mixture flow in the conduit.

29. In an internal combustion engine fueling system of the character described, providing a carburetor and an intake manifold having an inlet communicating with the carburetor and mixture delivery passages leading to the engine, the combination therewith of a valve device in the zone of the manifold inlet, formed to provide ports therein of predetermined minimum capacity and additional ports of larger capacity, said valve device being adapted for movement relative to the manifold inlet in response to manifold suction developed upon engine cranking, such as to effect sequentially as said suction increases to a maximum, opening of said minimum capacity ports to the manifold passages for establishing fuel and air flow communication between the manifold inlet and said passages, and thence a highly restrictive part-opening of said larger capacity ports to the manifold passages, for establishing flow communication between the inlet and said passages such as to determine high velocity flow of fuel and air directionally in the passages.

30. In an internal combustion engine fueling system of the character described, providing a carburetor and an intake manifold having an inlet communicating with the carburetor and mixture delivery passages leading to the engine, the combination therewith of a valve device in the zone of the manifold inlet, formed to provide ports therein of predetermined minimum capacity and additional ports of larger capacity, said valve device being adapted for movement relative to the manifold inlet in response to manifold suction developed upon engine cranking, such as to effect sequenitially as said suction increases to a maximum, opening of said minimum capacity ports to the manifold passages for establishing fuel and air flow communication between the manifold inlet and said passages, and thence a highly restrictive part-opening of said larger capacity ports to the manifold passages, for establishing flow communication between the inlet and said passages such as to determine high velocity flow of fuel and air directionally in the passages, and means operable in response to suction developed in the carburetor upon power operation of the engine at a predetermined speed, for effecting movement of said valve device to an extent such as to determine substantially full opening of said larger capacity ports thereof to the manifold passages.

31. In an internal combustion engine fueling system of the character described, providing a carburetor having a primary Venturi passage therein, and an intake manifold having an inlet communicating with the carburetor and mixture delivery passage leading to the engine the combination therewith of a valve device in the zone of the manifold inlet, formed to provide ports therein of predetermined minimum capacity and additional ports of larger capacity, said valve device being adapted for movement relative to the manifold inlet in response to manifold suction developed upon engine cranking, such as to effect sequentially as said suction increases to a maximum, opening of said minimum capacity ports to the manifold passages for establishing fuel and air flow communication between the manifold inlet and said passages, and thence a highly restrictive part-opening of said larger capacity ports to the manifold passages, for establishing flow communication between the inlet and said passages such as to determine high velocity flow of fuel and air in intimate mixture and directionally in the passages, a pneumatic device having a suction connection with said primary Venturi passage of the carburetor, and a lost-motion connection between said pneumatic device and said valve device, said pneumatic device being operable through said connection and in response to venturi suction developed upon power operation of the engine at a predetermined speed, for effecting movement of said valve device to an extent such as to determine substantially full opening of said larger capacity ports thereof to the manifold passages.

32. The method of preventing detonation and improving manifold mixture distribution in internal combustion engines, which comprises manually controlling the supply of fuel mixture for low speed operation, restricting admission of fuel mixture to the manifold while the engine is being accelerated by operation of the manual control, controlling fuel mixture division and flow direction in the manifold upon manifold admission of the mixture, and utilizing kinetic suction developed anterior to the zone of mixture flow restriction upon engine speed increase to a predetermined rate, to relieve the manifold flow restriction.

33. The method of operating an internal combustion engine, which comprises manually controlling the supply of fuel mixture for low speed operation, restricting fuel mixture admission to the manifold when the engine speed is below a predetermined rate, eliminating the admission restriction when the engine speed exceeds said predetermined rate, and controlling fuel mixture division and flow direction in the manifold throughout engine operation.

34. The method of operating an internal combustion engine, which comprises manually controlling the supply of fuel mixture for delivery to the manifold, automatically restricting fuel mixture admission to the manifold during engine speeds below a predetermined rate, utilizing kinetic suction developed anterior to the zone of manifold admission restriction when the engine speed exceeds the predetermined rate, to eliminate the restriction, and controlling fuel mixture division and flow direction in the manifold throughout engine operation.

GEORGE R. ERICSON.

REFERENCES CITED

The following references are of record in the file of this patent:

UNITED STATES PATENTS

| Number | Name | Date |
|---|---|---|
| 1,926,019 | Aseltine | Sept. 12, 1933 |
| 1,991,531 | White | Feb. 19, 1935 |
| 2,093,960 | Ericson | Sept. 21, 1937 |
| 2,337,982 | Ericson | Dec. 28, 1943 |